United States Patent
Russell et al.

(12)
(10) Patent No.: US 6,680,351 B1
(45) Date of Patent: Jan. 20, 2004

(54) PHOSPHITE ADDITIVES IN POLYOLEFINS

(75) Inventors: Mark K. Russell, Bartlesville, OK (US); David R. Battiste, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 97 days.

(21) Appl. No.: 09/357,257

(22) Filed: Jul. 20, 1999

(51) Int. Cl.[7] .......................... C08K 5/524; C08K 5/17; C08K 5/13; C08K 3/22

(52) U.S. Cl. .................. 524/120; 524/247; 524/424; 524/436; 524/128; 524/349; 524/351

(58) Field of Search .................. 524/120, 247, 524/424, 436, 128, 413, 349, 351, 352

(56) References Cited

U.S. PATENT DOCUMENTS

| | | | | |
|---|---|---|---|---|
| 4,611,024 A | | 9/1986 | Wolfe | 524/366 |
| 5,001,176 A | * | 3/1991 | Nakazima | 524/48 |
| 5,015,679 A | | 5/1991 | Matumura | 524/99 |
| 5,179,063 A | * | 1/1993 | Harris et al. | 502/414 |
| 6,156,845 A | * | 12/2000 | Saito et al. | 525/240 |
| 6,231,804 B1 | * | 5/2001 | Yamauchi et al. | 264/488 |
| 6,313,225 B2 | * | 11/2001 | Saito et al. | 525/240 |

* cited by examiner

*Primary Examiner*—Peter Szekely
(74) *Attorney, Agent, or Firm*—Kilpatrick Stockton LLP

(57) ABSTRACT

A polyolefin composition having high resistance to degradation, said composition formed by combining components comprising at least one polyolefin component produced from a transition metal halide catalyst, bis(2,4-dicumylphenyl)pentaerythritol diphosphite, triisopropanolamine, a hydrotalcite component, and at least one phenol component.

22 Claims, No Drawings

PHOSPHITE ADDITIVES IN POLYOLEFINS

FIELD OF INVENTION

This invention relates to the field of polyolefin compositions and manufactures. Particularly, this invention relates to the field of polyolefin compositions and manufactures produced by combining components comprising at least one polyolefin component produced from a transition metal halide catalyst, bis(2,4-dicumylphenyl)pentaerythritol diphosphite, triisopropanolamine, at least one hydrotalcite component, and at least one phenol component.

BACKGROUND OF THE INVENTION

Polyolefins are used in a variety of diverse applications. For example, such applications include food packaging, electronic components, automobile parts, fibers and fabrics, and medical equipment. Polyolefins could not perform such diverse functions without the assistance of a very broad range of additives. Without additives, polyolefins can degrade during processing and over time can lose impact strength, discolor, and become statically charged. Additives not only overcome these and other limitations, but also can impart improved performance properties to a final polyolefin product. One type of additive is antioxidants which usually are used to retard the degradation of polymers.

Degradation can be initiated when free radicals, highly reactive species with an unpaired electron, are created in polyolefins by heat, ultraviolet radiation, mechanical shear, or metallic impurities. It is believed when a free radical is formed, a chain reaction can begin that initiates oxidation of the polyolefin component. Subsequent reaction of the radical with an oxygen molecule can yield a peroxy radical, which then can react with an available hydrogen atom to form an unstable hydroperoxide and another free radical. In the absence of an antioxidant, these reactions can become self-propagating and can lead to degradation.

There are two basic types of antioxidants, primary and secondary antioxidants. It is believed that primary antioxidants can intercept and stabilize free radicals by donating active hydrogen atoms. It also is believed that secondary antioxidants can prevent formation of additional free radicals by decomposing unstable hydroperoxides into a stable product. When primary antioxidants, such as hindered phenols, are utilized, polyolefins can have a more yellow color than unstabilized polyolefins, therefore decreasing the commercial value of the polyolefins. Secondary antioxidants, such as phosphite compounds, often are utilized to increase the stability and whiteness of polyolefins.

Bis(2,4-dicumylphenyl)pentaerythritol diphosphite is a secondary antioxidant that provides excellent resistance against polyolefin degradation. However, when the polyolefin component containing bis(2,4-dicumylphenyl) pentaerythritol diphosphite is exposed to high temperature and humidity, as much as 80% of the bis(2,4-dicumylphenyl)pentaerythritol diphosphite can degrade over a period of twelve weeks. For example, these conditions can occur when a polyolefin component is transported from a polyolefin polymerization facility to a facility where the polyolefin component is used to make various products.

There is a need in the industry to provide a process for producing a polyolefin composition comprising at least one polyolefin component produced from a transition metal halide catalyst and bis(2,4-dicumylphenyl)pentaerythritol diphosphite where the bis(2,4-dicumylphenyl) pentaerythritol diphosphite does not degrade as quickly in the polyolefin composition.

SUMMARY OF THE INVENTION

It is an object of this invention to provide a process for producing a polyolefin composition having high resistance to degradation.

It is another object of this invention to provide a polyolefin composition having high resistance to degradation.

It is another object of this invention to provide a process for producing a manufacture from the polyolefin composition.

It is yet another object of this invention to provide a manufacture produced from the polyolefin composition.

In a first embodiment of this invention, a process for producing a polyolefin composition having high resistance to degradation is provided, said process comprising combining components comprising at least one polyolefin component produced from a transition metal halide catalyst, bis(2,4-dicumylphenyl)pentaerythritol diphosphite, triisopropanolamine, at least one hydrotalcite component, and at least one phenol component.

In a second embodiment of this invention, a polyolefin composition having high resistance to degradation is provided, said composition formed by combining components comprising at least one polyolefin component produced from a transition metal halide catalyst, bis(2,4-dicumylphenyl)pentaerythritol diphosphite, triisopropanolamine, at least one hydrotalcite component, and at least one phenol component.

In a third embodiment of this invention, a process of producing a manufacture from the polyolefin composition is provided.

In a fourth embodiment of this invention, a manufacture produced from the polyolefin composition is provided.

DETAILED DESCRIPTION OF INVENTION

In a first embodiment of this invention, a process of producing a polyolefin composition having high resistance to degradation is provided, said process comprising combining components comprising at least one polyolefin component produced from a transition metal halide catalyst, bis(2,4-dicumylphenyl)pentaerythritol diphosphite, triisopropanolamine, at least one hydrotalcite, and at least one phenol component.

The term "polyolefin component", as used in this disclosure, includes homopolymers as well as copolymers of olefinic compounds produced using a transition metal halide catalyst. Generally, the transition metal halide catalyst comprises a metal halide compound and a transition metal compound. The metal halide compound is selected from the group consisting of metal dihalides and metal hydroxyhalides. Suitable transition metal halide catalysts are disclosed and claimed in U.S. Pat. Nos. 4,325,837 and 4,394,291. Currently, titanium is the preferred transition metal and magnesium dichloride is the preferred metal halide.

Usually, the polyolefin component is selected from the group consisting of homopolymers comprising polymerized monomers having from 2 to about 10 carbon atoms per molecule and copolymers comprising at least two different polymerized monomers having from 2 to about 16 carbon atoms per molecule. Exemplary monomers, that can be polymerized to produce homopolymers and copolymers with excellent properties, are selected from the group consisting of ethylene, propylene, 1-butene, 1-pentene, 4-methyl-1-pentene, 1-hexene, 1-octene, and other higher olefins and conjugated or non-conjugated diolefins such as 1,3-butadiene, isoprene, piperylene, 2,3-dimethyl-1,3- butadiene, 1,4-pentadiene, 1,7-hexadiene, and other such diolefins and mixtures thereof. Preferably, said copolymer comprises polymerized ethylene and a polymerized higher alpha-olefin having from about 3 to about 16 carbon atoms per molecule. Propylene, 1-butene, 1-pentene, 1-hexene, 4-methyl-1-pentene, and 1-octene are especially preferred monomers for use with ethylene due to ease of copolymerization and best resultant copolymer properties.

Generally, the polyolefin component can be obtained through polymerization of an olefinic compound or compounds by conventional techniques known in the art. For example, the polyolefin component can be produced by solution polymerization, slurry polymerization, or gas phase polymerization using conventional equipment and contacting processes.

Bis(2,4-dicumylphenyl)pentaerythritol has the formula:

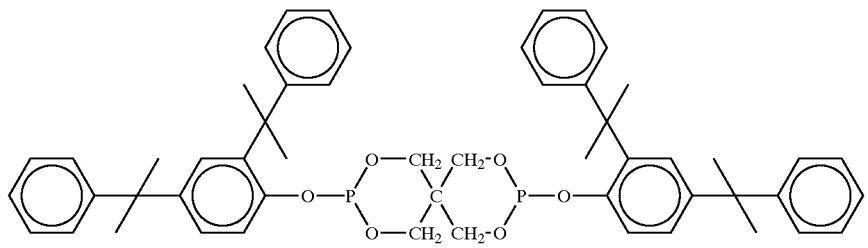

Bis(2,4-dicumylphenyl)pentaerythritol can be obtained commercially under the trademark name of Doverphos S-9228 from Dover Chemical Company in Dover, Ohio.

Bis(2,4-dicumylphenyl)pentaerythritol is present in the polyolefin composition in a suitable amount to prevent degradation of the polyolefin component. Generally, bis(2,4-dicumylphenyl)pentaerythritol can be present in an amount within a range of about 100 mg/kg to about 5,000 mg/kg based on the mass of the polyolefin component without additives. Concentrations below 100 mg/kg can be insufficient to prevent degradation. Amounts above 5,000 mg/kg can exceed U.S. Food and Drug Administration limitations, can increase costs, and can provide no additional benefit to prevent degradation. Preferably, bis(2,4-dicumylphenyl)pentaerythritol is added in an amount within a range of about 100 mg/kg to about 2000 mg/kg based on the mass of the polyolefin component without additives, most preferably, within a range of 100 mg/kg to 1500 mg/kg based on the mass of the polyolefin component without additives. These preferred ranges are optimum since they substantially prevent degradation at a minimal cost.

Triisopropanolamine has the formula:

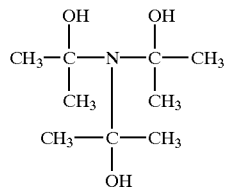

Triisopropanolamine is available commercially under the trademark name of Triisopropanolamine 99 from Dow Chemical Company in Midland, Mich. A blend of bis(2,4-dicumylphenyl) pentaerythritol diphoshite and triisopropanolamine is commercially available under the trademark name of Doverphos S9228T from Dover Chemical Company in Dover, Ohio.

Generally, triisopropanolamine is present in an amount less than about 5% by weight based on the mass of the polyolefin component without additives. Preferably, said triisopropanolamine is present in an amount within the range of about 0.5% by weight to about 3% by weight based on the mass of the polyolefin component without additives. Most preferably, said triisopropanolamine is present in an amount within a range of 0.5% by weight to 2% by weight based on the mass of the polyolefin component without additives.

The hydrotalcite component can be any magnesium-aluminum hydroxide compound. Generally, the hydrotalcite component is hydrated and contains a mixture of aluminum hydroxide and a magnesium salt, such as, for example, magnesium sulfate or magnesium phosphate. The hydrotalcite component can be obtained as a natural product or synthetic product. The natural product is held to possess the structure, $Mg_6Al_2(OH)_{16}CO_3 \cdot 4H_2O$. Suitable hydrotalcite components can be selected from the group consisting of $Mg_{0.7}Al_{0.3}(OH)_2(CO_3)_{0.15} \cdot 0.54H_2O$, $Mg_{4.5}Al_2(OH)_{13}CO_3 \cdot 3.5H_2O$, $MgCO_3 5Mg(OH)_2 2Al(OH)_3 \cdot 4H2O$, and $Mg_{4.2}Al_2(OH)_{12.4}CO_3$. Preferably, the hydrotalcite component is $MgCO_3 5Mg(OH)_2 2Al(OH)_3 \cdot 4H2O$, which is commercially available under the trademark name of DHT-4A from Kyowa Chemical Industry Company in Osaha, Japan.

The hydrotalcite component can also include any zinc-aluminum hydroxide compound. For example, a zinc-aluminum hydroxide is commercially available under the trademark name of ZHT-4D from Kyowa Chemical Industry Company in Osaka, Japan.

Generally, the hydrotalcite component is present in an amount less than about 500 mg/kg based on the mass of the polyolefin component without additives. Preferably, said hydrotalcite component is present in an amount within the range of about 10 mg/kg to about 300 mg/kg based on the mass of the polyolefin component without additives. Most preferably, the hydrotalcite component is present in an amount within a range of 10 mg/kg to 150 mg/kg based on the mass of the polyolefin component without additives. These preferred ranges efficiently extends the life of the bis(2,4-dicumylphenyl)pentaerythritol in the polyolefin composition.

The phenol component comprises at least one hindered phenol. The phenol components can be added to the polyolefin component as primary antioxidants that can prevent degradation of polyolefin compositions. There are many different hindered phenols which are equally suitable for use in this invention either singly or in combination with each other that are well known to those skilled in the art. Hindered phenols can be selected from the group consisting of monophenols, bisphenols, thiobisphenols, polyphenols, hydroxybenzyl aromates, amides of β-(3,5-di-tert-butyl-4-hydroxyphenyl)-propionic acid, esters of β-(3,5-di-tert-butyl-4-hydroxyphenyl)-propionic acid with mono- or polyvalent alcohols, spiro compounds, and mixtures thereof.

Exemplary monophenols include, but are not limited to, 2,6-di-tert-butyl-4-methylphenol; 2-tert-butyl-4-methoxyphenol; and 4-(hydroxymethyl)-2,6-di-tert-butylphenol.

Exemplary bisphenols include, but are not limited to, 2,2'-methylene-bis-(6-tert-butyl-4-methylphenol); 2,2'-methylene-bis-(6-tert-butyl-4-ethylphenol); 2,2-methylene-bis-[4-methyl-6-(α-methylcyclohexyl)-phenol]; 1,1-bis-(5-tert-butyl-4-hydroxy-2-methyl-phenyl)-butane; 2,2-bis-(5-tert-butyl-4-hydroxy-2-methylphenyl)-butane; 2,2-bis-(3,5-di-tert-butyl-4-hydroxyphenyl)-propane; 1,1,3-tris-(5-tert-butyl-4-hydroxy-2-methylphenyl)-butane; 2,2-bis-(5-tert-butyl-4-hydroxy-2-methylphenyl)-4-n-dodecylmercapto-butane; 1,1,5,5,-tetra-(5-tert-butyl-4-hydroxy-2-methyl-phenyl)-pentane; ethylene glycol-bis-[3,3 -bis-(3'-tert-butyl-4'-hydroxyphenyl)-butyrate]; 1,1-bis-(3,5-dimethyl-2-hydroxyphenyl)-3-(n-dodecylthio)-butane; and 4,4'-thio-bis-(6-tert-butyl-3-methylphenol).

Exemplary thiobisphenols include, but are not limited to, 4,4'-thiobis(6-tert-butyl-m-cresol); 1,1'-thiobis(2-naphthol); and 2,2'-thiobis(4-methyl-6-tert-butylphenol).

Exemplary polyphenols include, but are not limited to, tetrakis(methylene-3-(3,5-di-tert-butyl-4-hydroxyphenyl) propionate) methane; 1,3,5-trimethyl-2,4,6-tris(3,5-di-tert-butyl-4-hydroxybenzyl)-benzene; 1,3,5-tris(3,5-di-tert-butyl-4-hydroxybenzyl)isocyanurate; and tetrakis [methylene (3,5-di-tert-butyl-4-hydroxyhydrocinnamate)] methane.

Exemplary hydroxybenzyl aromates include, but are not limited to, 1,3,5-tri-(3,5-di-tert-butyl-4-hydroxybenzyl)-2,4, 6-trimethylbenzene; 2,2-bis-(3,5-di-tert-butyl-4-hydroxybenzyl)-malonic acid-dioctadecyl ester; 1,3,5-tris-(3,5-di-tert-butyl-4-hydroxybenzyl)-isocyanurate; and 3,5-di-tert-butyl-4-hydroxybenzyl-phosponic acid-diethyl ester.

Exemplary amides of β-(3,5-di-tert-butyl-4-hydroxyphenyl)-propionic acid include, but are not limited to, 1,3,5-tris-(3,5-di-tert-butyl-4-hydroxyphenyl-propionyl-hexahydro-s-triazine and N,N'-di(3,5-di-tert-butyl-4-hydroxyphenyl-propionyl)-hexamethylenediamine.

Exemplary esters of β-(3,5-di-tert-butyl-4-hydroxyphenyl)-propionic acid include, but are not limited to, esters of P-(3,5-di-tert-butyl-4-hydroxyphenyl)-propionic acid with mono- or polyvalent alcohols, such as with methanol, octadecanol, 1,6-hexanediol, ethylene glycol, thiodiethylene glycol, neopentyl glycol, pentaerythritol, and tris-hydroxyethyl-isocyanurate.

Exemplary spiro compounds include, but are not limited to, diphenolic spiro-diacetals or spiro-diketals, such as, for example, 2,4,8,10-tetraoxaspiro-[5,5]-undecane substituted in the 3- and 9- position with phenolic radicals, such as 3,9-bis-(3,5-di-tert-butyl-4-hydroxyphenyl)-2,4,8,10-tetraoxaspiro-[5,5]-undecane and 3,9-bis-[1,1-dimethyl-2-(3,5-ditert-butyl-4-hydroxyphenyl)-ethyl]-2,4,8,10-tetraoxaspiro-[5,5]-undecane.

Preferably, hindered phenols are selected from the group consisting of tetrakis [methylene (3,5-di-tert-butyl-4-hydroxyhydrocinnamate)]methane; 1,3,5-tri-(3,5-di-tert-butyl-4-hydroxybenzyl)-2,4,6-trimethylbenzene; β-(3,5-di-tert-butyl-4-hydroxyphenyl)-propionic acid-n-octadecyl ester; 2,6-di-tert-butyl-4-methyl-phenol; 3,9-bis-[1,1-dimethyl-2-(3,5-di-tert-butyl-4-hydroxy-phenyl)-ethyl]-2,4, 8,10-tetraoxaspiro-[5,5]-undecane, and mixtures thereof. These preferred hindered phenols are good primary antioxidants and can prevent degradation of polyolefin compositions.

Most preferably, said hindered phenol component is tetrakis [methylene (3,5-di-tert-butyl-4-hydroxyhydrocinnamate)]methane, since it provides excellent protection against degradation of polyolefin compositions. Tetrakis [methylene (3,5-di-tert-butyl-4-hydroxyhydrocinnamate)]methane can be obtained commercially from Ciba-Geigy Corporation under the trademark name of Irganox 1010 or from Great Lakes Chemical Company in West Lafayette, Ind., under the trademark name of Anox 20.

Generally, the hindered phenol is present in an amount less than about 5000 mg/kg based on the mass of the polyolefin component without additives. Preferably, said hindered phenol is present in an amount within the range of about 1 mg/kg to about 2000 mg/kg based on the mass of the polyolefin component without additives. Most preferably, said hindered phenol is present in an amount within a range of 50 mg/kg to 1000 mg/kg based on the mass of said polyolefin component without additives. Hindered phenol concentrations above 5000 mg/kg can exceed FDA limits and can increase production costs, and phenol concentrations below 50 mg/kg can be too low to prevent degradation of polyolefin compositions.

Other components can be also be blended with the polyolefin composition. For example, antifogging agents, antimicrobial agents, coupling agents, flame retardants, forming agents, fragrances, lubricants, mold release agents, organic peroxides, smoke suppressants, and heat stabilizers. Further information on these compounds can be found in Modern Plastics Encyclopedia, 1992, pages 143–198.

Any of the additives herein discussed can be combined with the polyolefin component according to any method known in the art and at any time after formation of the polyolefin component in production processes, or prior to, during, or after fabrication into a manufacture. While additives are typically incorporated into polyolefins prior to fabrication into articles, it is also possible to apply the additives by a topical application to the finished articles. Exemplary methods of combining the additives with said polyolefin component, include, but are not limited to, mixing, pelletizing, extruding, and mixtures thereof. The additives can be preblended together and then combined with the polyolefin component, or the additives can be combined individually with the polyolefin component. The additives may be in solid form, solution, or a slurry. The polyolefin component can be in any form, such as, for example, fluff, powder, granulate, pellet, solution, slurry, and/or emulsion.

The polyolefin composition can be used to produce manufactures. The polyolefin composition can be formed into a manufacture by any means known in the art. For example, the polyolefin composition can be formed into a manufacture by blow molding, injection molding, and extrusion molding. Further information on processing the polyolefin composition into a manufacture can be found in MODERN PLASTICS ENCYCLOPEDIA, 1992, pages 222–298.

EXAMPLES

The following examples are provided to assist a person skilled in the art with further illustrations of this invention. These examples are intended to be illustrative of the invention but are not meant to be construed as limiting the reasonable scope of the invention.

Chemical compounds utilized in these examples are summarized below:

A. bis(2,4-dicumylphenyl) pentaerythritol diphosphite, commercially available as Doverphos S-9228, which is a registered trademark of Dover Chemical Company in Dover, Ohio;

B. bis(2,4-dicumylphenyl) pentaerythritol diphosphite and triisopropanolamine blend, commercially available as Doverphos S9228T, which is a registered trademark of Dover Chemical Company in Dover, Ohio;

C. tetrakis [methylene (3,5-di-tert-butyl-4-hydroxy-hydrocinnamate)] methane, a hindered phenol, commercially available as Anox 20, which is a registered trademark of Great Lakes Chemical Company in West Lafayette, Ind.;

D. $MgCO_3 5Mg(OH)_2 2Al(OH)_3 \cdot 4H2O$, a hydrotalcite component, commercially available as DHT-4A, which is a registered trademark of Kyowa Chemical Industry Company in Osaha, Japan;

E. Ethylene-hexene copolymer commercially available as Marlex® HHM 55180F from Phillips Petroleum Company;

The ethylene-hexene copolymer has the following characteristics:
Density: 0.954–0.956 grams/cc as determined by ASTM D1505 Melt Index: 16–20 grams/10 minutes as determined by ASTM D1238

The amount of bis(2,4-dicumylphenyl)pentaerythritol diphosphite in the polyolefin composition was determined by high performance liquid chromatography (HPLC). A Waters high performance liquid chromatograph equipped with a Waters 486 tunable detector set at 220 nanometers was used. A polyolefin composition was prepared by grinding the polyolefin composition to a mesh size of 20 to produce a ground polyolefin composition. One gram samples of the ground polyolefin composition were placed into three containers, and 10.0 mL of methylene chloride were added to each container. The containers were then sonicated for 3 hours at a temperature of 40–45° C. using an ultrasonic bath. The samples were allowed to cool to room temperature and then filtered using a 0.5 micrometer filter. Approximately 1 mL of each sample was transferred to an autoinjector sample vial, and the vials were placed into the autoinjector of the high performance liquid chromatograph.

Example 1

0.05 wt. % of Doverphos S9228T of ethylene-hexene copolymer, 0.07 wt. % of Anox 20 of ethylene-hexene copolymer, and 0.02 wt % of DHT-4A of ethylene-hexene copolymer were dry blended together for about two minutes, then added to the ethylene-hexene copolymer during an extruding process producing a polyolefin composition.

A twin screw extruder with four separate temperature zones was utilized. Zone one was at 190° C., zone two was at 210° C., zone three was at 220° C., and zone 4 was at 215° C. The extruder screws rotated at 25 revolutions per minute (rpm). After extruding the polyolefin composition, each strand was pelletized and placed in a sample carton.

The pellets were placed in a humidity oven at 60° C. and 95% relative humidity for twelve weeks. Periodically, a portion of the pellets were removed and analyzed by high performance liquid chromatography to determine the amount of bis(2,4-dicumylphenyl) pentaerythritol diphosphite.

After 5 weeks, approximately 82% by weight of the bis(2,4-dicumylphenyl) pentaerythritol diphosphite was present, and after 12 weeks, 80% by weight remained.

Comparative Example 1

The same procedure as disclosed in Example 1 was used except DHT-4A and triisopropanolamine were not added to the ethylene-hexene copolymer. After 6 weeks, only 15% by weight of the bis(2,4-dicumylphenyl) pentaerythritol diphosphite was present, and after 12 weeks, only 10% by weight remained.

Comparative Example 2

The same procedure as disclosed in Example 1 was used except DHT-4A was not added to the ethylene-hexene copolymer. After 6 weeks, only 45% by weight of the bis(2,4-dicumylphenyl) pentaerythritol diphosphite was present, and after 12 weeks, only 3% by weight remained.

Comparative Example 3

The same procedure as disclosed in Example 1 was used except triisopropanolamine was not added to the ethylene-hexene copolymer. After 6 weeks, only 12% by weight of the bis(2,4-dicumylphenyl) pentaerythritol diphosphite was present, and after 12 weeks, only 8% by weight remained.

These comparative examples show that without the combination of triisopropanolamine, a hydrotalcite component, and at least one phenol component, the bis(2,4-dicumylphenyl) pentaerythritol diphosphite degrades in the polyolefin composition, which then subjects the polyolefin composition to degradation.

That which is claimed is:

1. A process of producing a polyolefin composition having high resistance to degradation, said process comprising:
   1) combining components comprising a polyolefin component produced from a transition metal halide catalyst, bis(2,4-dicumylphenyl)pentaerythritol diphosphite, triisopropanolamine, a hydrotalcite component, and at least one phenol component; wherein said transition metal halide catalyst comprises a metal halide compound selected from metal dihalides or metal hydroxyhalides and a transition metal compound;
   wherein said polyolefin component is selected from homopolymers comprising polymerized monomers having from 2 to about 10 carbon atoms per molecule or copolymers comprising at least two different polymerized monomers having from 2 to about 16 carbon atoms per molecule.

2. A process according to claim 1, wherein said monomers are selected from olefins, conjugated or non-conjugated diolefins or mixtures thereof.

3. A process according to claim 1, wherein bis(2,4-dicumylphenyl)pentaerythritol diphosphite is added in an amount within a range of about 100 mg/kg to about 2000 mg/kg based on the mass of the polyolefin component without additives.

4. A process according to claim 3, wherein said triisopropanolamine is present in an amount within the range of about 0.5% by weight to about 3% by weight based on the mass of the polyolefin component without additives.

5. A process according to claim 1, wherein the hydrotalcite component is present in an amount within the range of about 10 mg/kg to about 300 mg/kg based on the mass of the polyolefin component without additives.

6. A process according to claim 1, wherein the phenol component is present in an amount within the range of about 1 mg/kg to about 2000 mg/kg based on the mass of the polyolefin component without additives.

7. A process according to claim 1, wherein said hydrotalcite components is selected from $Mg_{0.7}Al_{0.3}(OH)_2 (CO_3)_{0.15} \cdot 0.54H_2O$, $Mg_{4.5}Al_2(OH)_{13}CO_3 \cdot 3.5H_2O$, $MgCO_3 5Mg(OH)_2 2Al(OH)_3 \cdot 4H_2O$, or $Mg_{4.2}Al_2(OH)_{12.4}CO_3$.

8. A process according to claim 1, wherein the phenol component is selected from monophenols, bisphenols, thiobisphenols, polyphenols, hydroxybenzyl aromates, amides of β-(3,5-di-tert-butyl-4-hydroxyphenyl)-propionic acid, esters of β-(3,5-di-tert-butyl-4-hydroxyphenyl)-propionic acid with mono- or polyvalent alcohols, spiro compounds, or mixtures thereof.

9. A process according to claim 1, wherein bis(2,4-dicumylphenyl)pentaerythritol diphosphite is added in an amount within a range of 100 mg/kg to 1500 mg/kg based on the mass of the polyolefin component without additives.

10. A process according to claim 1, wherein triisopropanolamine is present in an amount within a range of 0.5% by weight to 2% by weight based on the mass of the polyolefin component without additives.

11. A process according to claim 1, wherein the hydrotalcite component is present in an amount within a range of 10 mg/kg to 150 mg/kg based on the mass of the polyolefin component without additives.

12. A process according to claim 1, wherein the phenol component is selected from tetrakis [methylene (3,5-di-tert-butyl-4-hydroxyhydrocinnamate)]methane; 1,3,5-tri-(3,5-di-tert-butyl-4-hydroxybenzyl)-2,4,6-trimethylbenzene; β-(3,5-di-tert-butyl-4-hydroxyphenyl)-propionic acid-n-octadecyl ester; 2,6-di-tert-butyl-4-methylphenol; 3,9-bis-[1,1-dimethyl-2-(3,5-di-tert-butyl-4-hydroxy-phenyl)-ethyl]-2,4,8,10-tetraoxaspiro-[5,5]-undecane, or mixtures thereof.

13. A process according to claim 1, wherein said metal halide is magnesium dichloride and the metal in said transition metal compound comprises titanium.

14. A process according to claim 1, wherein said hydrotalcite component is $MgCO_3 5Mg(OH)_2 2Al(OH)_3 \cdot 4H_2O$.

15. A process according to claim 1, wherein said phenol component is tetrakis [methylene (3,5-di-tert-butyl-4-hydroxyhydrocinnamate)]methane.

16. A composition produced by the process in claim 1.

17. A polyolefin composition having high resistance to degradation, said composition formed by combining components comprising at least one polyolefin component produced from a transition metal halide catalyst comprising a metal halide compound selected from metal dihalides or metal hydroxyhalides and a transition metal compound, bis(2,4-dicumylphenyl)pentaerythritol diphosphite, triisopropanolamine, a hydrotalcite component, and at least one phenol component.

18. A process of using said composition in claim 3 to produce a manufacture.

19. A manufacture produced by the process in claim 4.

20. A process according to claim 1, wherein said olefins are selected from ethylene, propylene, 1-butene, 1-pentene, 4-methyl-1-pentene, 1-hexene, 1-octene or mixtures thereof.

21. A process according to claim 1, wherein said conjugated or non-conjugated diolefins are selected from 1,3-butadiene, isoprene, piperylene, 2,3-dimethyl-1,3-butadiene, 1,4-pentadiene, 1,7-hexadiene or mixtures thereof.

22. A process according to claim 1, wherein said triisopropanolamine is present in an amount within the range of about 0.5% by weight to about 3% by weight based on the mass of the polyolefin component without additives.

* * * * *